May 2, 1939.  W. R. FREEMAN  2,156,782
BRAKE CONTROL MECHANISM
Original Filed March 6, 1937  2 Sheets-Sheet 2
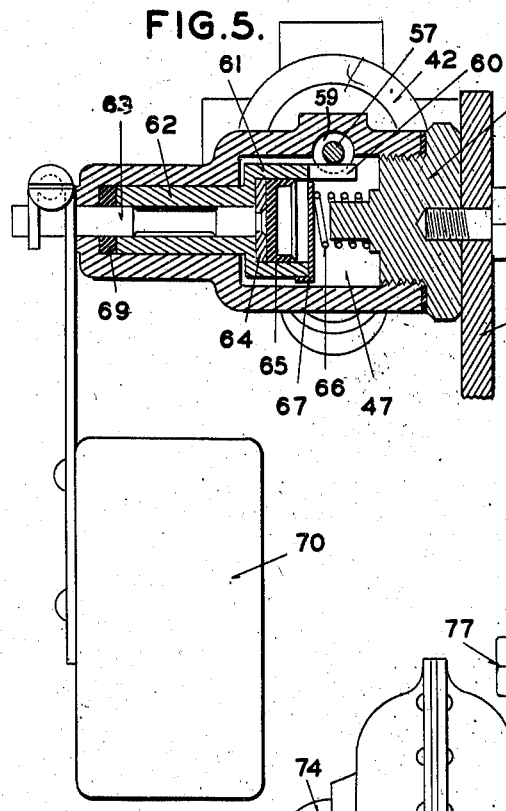
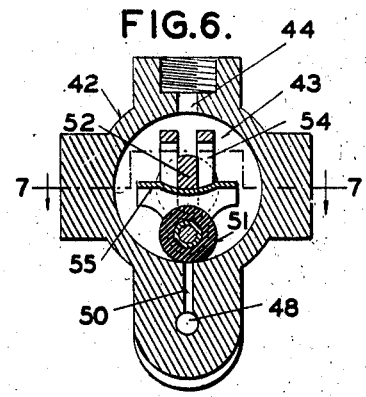
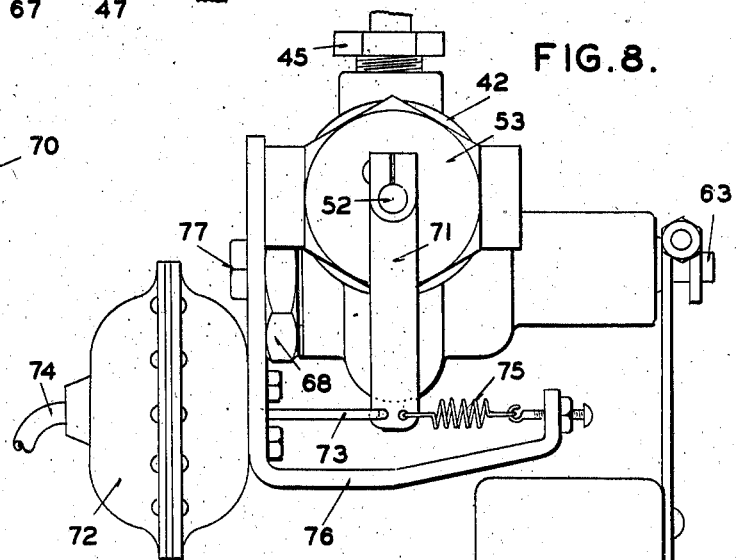
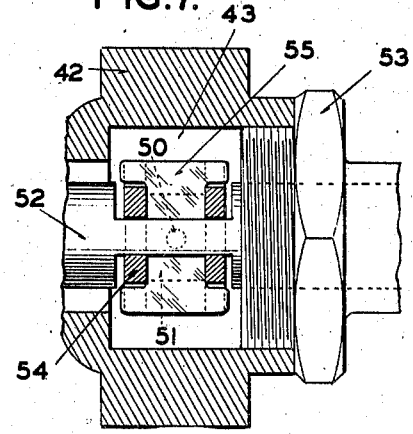
*INVENTOR*
W. R. FREEMAN
*ATTORNEY*

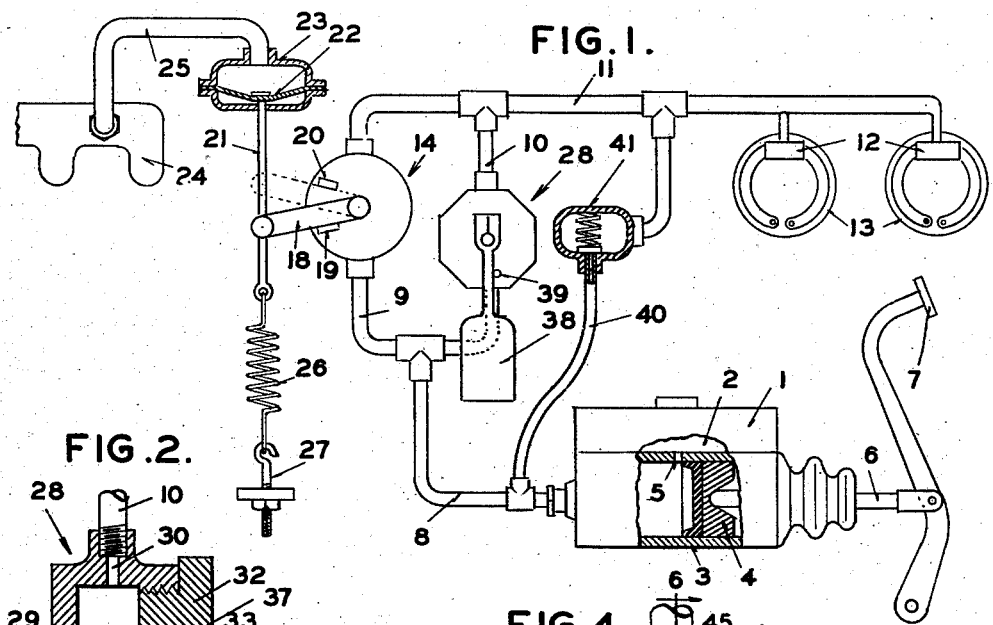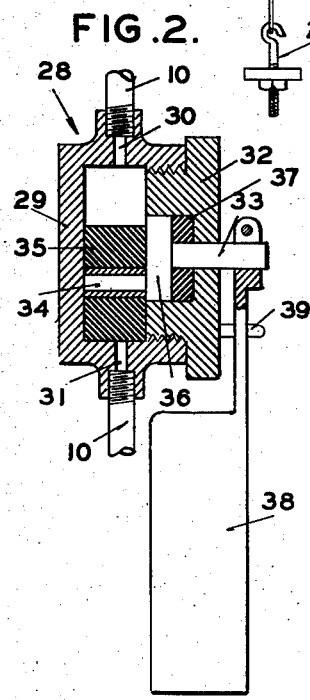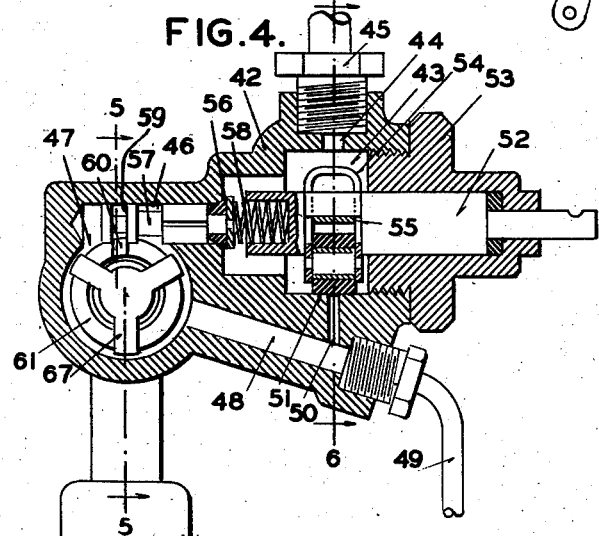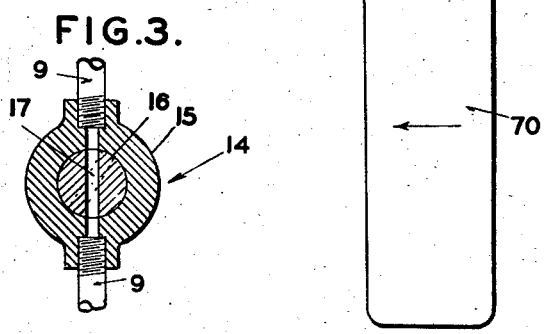

Patented May 2, 1939

2,156,782

UNITED STATES PATENT OFFICE 2,156,782

BRAKE CONTROL MECHANISM

Walter R. Freeman, University City, Mo., assignor to Wagner Electric Corporation, St. Louis, Mo., a corporation of Delaware Application March 6, 1937, Serial No. 129,371
Renewed September 8, 1938

15 Claims. (Cl. 188—265)

My invention relates to braking mechanism and more particularly to improved means for preventing release of the brakes from an applied position under certain conditions.

One of the objects of my invention is to provide a brake release preventing means which is adapted to be controlled by a predetermined degree of vacuum in a fluid-operated motor.

A more specific object of my invention is to control a fluid braking mechanism of a vehicle by two valves, one valve being governed by the action of gravity when the vehicle is stopped and by the action of inertia during deceleration of the vehicle and the other valve being controlled by a power-operated member.

Still a further object of my invention is to provide an improved pendulum-controlled valve for use in a fluid braking system to prevent the release of the brakes from an applied position.

Other objects of my invention will become apparent from the following description taken in connection with the accompanying drawings in which Figure 1 is a schematic view of a fluid braking system embodying my invention; Figure 2 is a cross-sectional view of the pendulum-controlled valve; Figure 3 is a cross-sectional view of the vacuum-controlled shutoff valve; Figure 4 is a view, partially in cross section, of a modified construction showing both the vacuum-controlled valve and the pendulum-controlled valve so combined as to form a single unit; Figure 5 is a cross-sectional view taken on the line 5—5 of Figure 4; Figure 6 is a cross-sectional view on the line 6—6 of Figure 4; Figure 7 is a cross-sectional view on the line 7—7 of Figure 6; and Figure 8 is an elevational view showing how the suction motor is connected to operate one of the valves.

Referring to Figures 1 to 3, inclusive, I have shown a hydraulic braking system comprising a master cylinder device 1 of usual construction having a reservoir 2, a cylinder 3, and a piston 4 which in its retracted position, as shown, uncovers a compensating port 5 for placing the reservoir in communication with the cylinder ahead of the piston. The piston is adapted to be reciprocated by means of a piston rod 6 connected to the brake pedal 7. The forward end of the cylinder is connected by a conduit 8 to conduits 9 and 10 which in turn are connected to the conduit 11 leading to the actuating motors 12 of the brake assemblies 13.

In accordance with my invention, I provide conduit 9 with a cock valve 14 which comprises a casing 15 and a rotatable spindle 16 having a cross passage 17 therein. The valve spindle extends to the exterior of the casing and has secured thereto a lever 18 for opening and closing the valve. When this lever is in its full line position, as shown in Figure 1, and against the lower stop 19 on casing 15, cross passage 17 of the spindle will place the two portions of conduit 9 in communication with each other. When lever 18 is turned to its dotted line position and against the upper stop 20 on casing 15, the valve spindle will be in a position where cross passage 17 therein will no longer connect the two portions of conduit 9, thus closing the valve. The lever 18 is connected by a rod 21 to the movable diaphragm 22 of a suction motor 23 which is adapted to be operated by the suction from the manifold 24 of the internal combustion engine on the vehicle, the connection being shown as a conduit 25. The lever 18 also has connected thereto a spring 26 which has its other end adjustably secured to a suitable support 27. The tension of the spring is such that the lever is maintained against stop 19 (valve open position) when the degree of vacuum in the suction motor is below a predetermined value which, in the present instance, will be any degree of vacuum that is established in the manifold when the engine is operating above idling speed. When the engine is idling, the vacuum established in the manifold will be sufficient to cause the suction motor to operate and overcome the tension of spring 26, thus moving lever 18 against stop 20 to close the valve.

The other conduit 10 is also provided with a valve 28 for closing this conduit to prevent fluid from flowing therethrough. This valve is adapted to be governed by a member which is under the action of gravity when the vehicle is stopped and under the action of inertia during deceleration of the vehicle. The valve structure comprises a casing 29 having a passage 30 connected to the portion of conduit 10 leading to the brakes, and a passage 31 connected to the portion of conduit 10 leading from the master cylinder device. The casing is provided with a closure plug 32 in which is journaled a shaft 33 provided upon its inner end with an eccentric pin 34. This pin has rotatably mounted thereon a rubber roller 35 which is adapted to cover the inner end of passage 31 when the eccentric pin 34 on the shaft is at its lower point and to uncover the inner end of passage 31 when shaft 33 is rotated through a predetermined angle. The rubber of the roller is relatively soft and its normal diameter is such that it must be slightly deformed to place it in the casing. This insures that there will be a sufficient surface of the rubber in contact with the casing wall to close passage 31 when the roller is in proper position. In order to prevent leakage through plug 32, the shaft is provided with an integral shoulder 36 and a rubber washer 37. The outer end of shaft 33 has secured thereto a pendulum 38 which is so connected to the shaft that when the pendulum is in the vertical position assumed when the vehicle is on a level roadway, roller 35 on eccentric pin 34 will close passage 31. A stop pin 39 also extends from plug 32 for preventing the pendulum from swinging rearwardly beyond its vertical position.

In addition to conduits 9 and 10 for conveying fluid to the fluid motors of the braking units, there is also employed a by-pass conduit 40 in which is provided a one-way valve structure 41 permitting fluid to flow only from the master cylinder to the braking system.

In the operation of the braking system just described, when the vehicle is stopped and the engine is idling, the degree of vacuum in the manifold will be such as to operate the suction motor 23 and close shutoff valve 14. If the vehicle should now be on a level roadway or facing upwardly on an inclined roadway, the pendulum will assume a position against stop 39 wherein roller 35 will close passage 31. If the brakes have been applied, fluid under pressure will be retained in the motors of the brake assemblies since conduits 9 and 10 are closed. Under these conditions, it will not be necessary to hold the foot upon the brake pedal, thus permitting the operator to employ his foot to operate other instruments, as for example, the accelerator pedal. If the brakes had not been applied, they may be applied, notwithstanding the fact that both conduits 9 and 10 are closed as fluid under pressure can be transferred to motors 12 through by-pass 40 and non-return valve 41. When it is desired to start the vehicle, the usual clutch (not shown) is engaged simultaneously with the speeding up of the engine by depressing the usual accelerator mechanism. The increase in speed of the engine will cause the vacuum in the manifold to decrease to such a point that spring 26 will be able to move lever 18 downwardly and open valve 14, thus releasing the brake pressure. This action will be substantially simultaneous with the engagement of the clutch and there will be little or no drag of the brakes when the vehicle starts.

If the vehicle is moving along a highway and it is desired to apply the brakes after removing the foot from the accelerator mechanism, the brakes will not be held in applied position under these conditions, notwithstanding the fact that valve 14 will become closed due to the operation of the suction motor. As soon as the brakes are applied, the vehicle will begin to decelerate and this deceleration of the vehicle will result in the pendulum swinging forwardly under the action of inertia. This forward position assumed by the pendulum will place shaft 33 in a position where roller 35 uncovers passage 31, thus permitting fluid under pressure to flow freely to and from the fluid motors of the brake assemblies. Thus, under these conditions, the brakes can be applied and released by movement of the brake pedal in the same manner as if neither valve 14 nor the pendulum-controlled valve 28 were associated with the braking system. This is the condition which is desired under the circumstances since the operator always wants to apply and release the brakes at will during retarding of the vehicle on a highway.

Referring to the modification shown in Figures 4, 5, 6, 7, and 8, there is disclosed a construction wherein the two shutoff valves and the non-return valve are combined in a unitary structure. The casing 42 is formed with a chamber 43 having an outlet 44 connected to the conduit 45 leading to the brake assemblies. This chamber is in communication by means of a passage 46 with a second chamber 47 which is connected by a passage 48 with the conduit 49 leading from the master cylinder. A passage 50 connects chamber 43 directly with passage 48. The passage 50 is controlled by a rubber roller 51 eccentrically mounted on the end of a shaft 52 journaled in the closure plug 53. The mounting for the roller is a U-shaped member 54 having slotted legs for receiving the rectangular portion of shaft 52 (Figure 6). As best shown in Figure 7, an I-shaped leaf spring 55 is interposed between the shaft and projections on the U-shaped member 54 in order to bias the roller against the wall of the chamber surrounding the end of passage 50.

As best shown in Figure 4, the passage 46 is controlled by a one-way valve 56 having a stem 57 extending into chamber 47. A spring 58 is interposed between the valve and the inner end of shaft 52 for biasing the valve on its seat. The stem 57 of the valve is formed with a groove 59 in which is received a projection 60 carried by a cup-shaped rotatable member 61 positioned in chamber 47 and having a sleeve 62 journaled in a bore in the casing. A shaft 63 is received by this sleeve and the inner end of the shaft carries a plate 64 for frictionally cooperating with the bottom of the cup-shaped rotatable member 61. A rubber packing cup 65 prevents leakage of fluid between plate 64 and member 61 and a spring 66 is interposed between a star-shaped plate 67 and a closure plug 68 for biasing member 61 against the packing 69 for shaft 63.

The shaft 63 is adapted to be connected to the rotatable member 61 only when the fluid in chamber 47 is under pressure and capable of forcing the plate into tight frictional engagement with the bottom of the cup-shaped member. The movement of shaft 63 is controlled by a pendulum 70 suitably secured to the exterior end of the shaft as shown.

As shown in Figure 8, shaft 52, which controls roller valve 51, has a lever 71 connected to its exterior end and this lever in turn is connected to the movable element of a suction motor 72 by means of the rod 73. The suction motor is connected for operation by the internal combustion engine by means of conduit 74. An adjustable spring 75 normally holds lever 52 in a position where the roller 51 will uncover the end of passage 50. The spring is adjusted so that the suction motor will not operate the lever to cause the roller to close passage 50 except when the engine is idling. The casing 42 is mounted on a suitable support 76 of the vehicle by means of a bolt 77 which is screwed into plug 68. This support is also employed for mounting the fixed end of spring 75. The casing is so positioned on the support that when the vehicle is on a horizontal roadway and the pendulum is in a vertical position, valve 56 will be closed as shown in Figure 4.

In operation, if the vehicle is stopped either on a level or on an ascending roadway, the engine will normally be idling and thus the suction motor 72 will be operative to cause roller 51 to close passage 50. The valve 56 will also be closed by spring 58 as the pendulum will be in a position wherein the valve will be unaffected. If the brakes have already been applied, they will be held so without continued pressure on the brake pedal. If they have not been applied, they may be applied and held so by moving the brake pedal and then releasing it. This will cause fluid under pressure to pass through passage 48, chamber 47, passage 46, valve 56, chamber 43 and then to the brakes by way of conduit 45. When it is desired to start the vehicle, the clutch need only be engaged and the accelerator operated in the usual manner. The increased speed of the engine causes the degree of vacuum in the manifold and the suction motor to be decreased which is sufficient to cause spring 75 to move lever 71 and cause the roller to be moved to a position where passage 50 is open. The brakes now become released and there will be no drag on the vehicle when it starts.

When the vehicle is moving along a highway and it is desired to apply the brakes to slow down, the accelerator will first be released, thus resulting in roller 51 closing the passage. This will cause the vehicle to decelerate and as a result of the action of inertia on the pendulum, it will be moved forwardly as indicated by the arrow (Figure 4). If the brakes have not been applied at the time that the pendulum swings forwardly, valve 56 will not be affected as there is no fluid under pressure in chamber 47 which will cause shaft 63 to be frictionally clutched to member 61. If the brakes are applied after the pendulum has assumed its forward position, the fluid under pressure will cause shaft 63 and member 61 to be connected together. The braking of the vehicle will result in greater deceleration thereof and, consequently, the pendulum will swing further forwardly and thus move valve 56 off its seat and cause it to be ineffective. The brakes, under these conditions, may be applied and released at will. If the vehicle is brought to a stop, the pendulum will assume its vertical position permitting valve 56 to close and the brakes may be held applied in a manner already referred to.

If the vehicle is moving along a highway and the brakes are applied prior to the swinging of the pendulum forwardly as a result of the action of inertia, then, of course, shaft 63 will be connected to member 61 and valve 56 will be opened when inertia causes the pendulum to move forwardly. When the vehicle is brought to a stop, the valve will become closed.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a vehicle braking mechanism, a fluid-actuated brake unit, a source of fluid pressure connected to the brake unit, said connecting means embodying two passages each of which is capable of conveying fluid to the brake unit, a valve in each of said passages for preventing return flow of fluid therethrough, power-operated means for controlling one of said valves, and gravity-actuated means for controlling the other of said valves.

2. In a vehicle braking mechanism, a fluid-actuated brake unit, a source of fluid pressure connected to the brake unit, said connecting means embodying two passages each of which is capable of conveying fluid to the brake unit, a valve in each of said passages for preventing return flow of fluid therethrough, a vacuum motor for closing one of said valves when the vacuum therein is greater than a predetermined value, and means governed by the action of gravity when the vehicle is stopped and by the action of inertia during deceleration of the vehicle for controlling the other valve.

3. In a vehicle braking mechanism, a fluid-actuated brake unit, a source of fluid pressure connected to the brake unit, said connecting means embodying two passages each of which is capable of conveying fluid to the brake unit, a valve in each of said passages for preventing return flow of fluid therethrough, a vacuum motor for closing one of said valves, a spring for maintaining said valve open when the vacuum in said motor is less than a predetermined value, and means for controlling the other of said valves.

4. In a motor vehicle provided with an internal combustion engine, a fluid-actuated brake unit and a source of fluid pressure connected to the brake unit, said connecting means embodying two passages each of which is capable of conveying fluid to the brake unit, a valve in each passage for preventing return flow of fluid therethrough, engine-operated power means for causing one of said valves to be closed when the engine is idling, and means governed by the action of gravity for closing the other valve.

5. In a motor vehicle provided with an internal combustion engine, a fluid-actuated unit and a source of fluid pressure connected to the brake unit, said connecting means embodying two passages each of which is capable of conveying fluid to the brake unit, a valve in each passage for preventing return flow of fluid therethrough, engine-operated means for closing one of said valves, and a pendulum for governing the operation of the other valve.

6. In a vehicle braking system, a fluid-actuated brake unit, a source of fluid pressure, a conduit for conveying fluid under pressure to the brake unit, a valve in said conduit for preventing return flow of fluid therethrough, said valve comprising a valve seat associated with the conduit and a valve element in the form of a roller mounted to rotate about a definite axis and cooperating with the valve seat, and means for rolling the roller valve element about its axis on or off the seat.

7. In a vehicle braking system, a fluid-actuated brake unit, a source of fluid pressure, a conduit for conveying fluid under pressure to the brake unit, a valve in said conduit for preventing return flow of fluid therethrough, said valve comprising a valve seat associated with the conduit and a valve element in the form of a roller for cooperating with the valve seat, a shaft, means for eccentrically mounting the roller on the shaft, a spring for biasing the roller against the seat, and means for rotating the shaft to thereby cause said roller to roll on or off the valve seat.

8. In a vehicle braking system, a fluid-actuated brake unit, a source of fluid pressure, a conduit for conveying fluid under pressure to the brake unit, a valve in said conduit for preventing return flow of fluid therethrough, said valve comprising a valve seat associated with the conduit and a valve element in the form of a roller for cooperating with the valve seat, a shaft, means for eccentrically mounting the roller on the shaft, and a pendulum connected to the shaft for controlling the roller.

9. In a vehicle braking system, a fluid-actuated brake, a source of fluid pressure, a conduit for conveying fluid under pressure to the brake unit, a valve in said conduit for preventing return flow of fluid therethrough, said valve comprising a valve seat associated with the conduit and a valve element for cooperating with the valve seat, a shaft, means for rotating the shaft, a member connected to move the valve on or off the seat, and means for operatively connecting the member to the shaft by fluid pressure in said conduit.

10. In a vehicle braking system, a fluid-actuated brake, a source of fluid pressure, a conduit for conveying fluid under pressure to the brake unit, valve means associated with said conduit for preventing return flow of fluid therethrough, said valve means comprising a casing, a valve seat in said casing and a valve element for cooperating with the valve seat, a shaft journaled in the wall of the casing, a pendulum for controlling the rotation of the shaft, a rotatable member connected to move the valve on or off the seat, and clutch means operable by fluid pressure in the casing for connecting the rotatable member to the shaft.

11. In a vehicle braking mechanism, a fluid-actuated brake unit, a source of fluid pressure connected to the brake unit, said connecting means embodying two passages each of which is capable of conveying fluid to the brake unit, a valve in one of said passages, a member for controlling the movable element of the valve, a pendulum, means operable by fluid pressure in the passage for connecting the pendulum to the member, a valve in the other passage, and means for opening and closing said last named valve.

12. In a vehicle braking mechanism, a fluid-actuated brake unit, a source of fluid pressure connected to the brake unit, said connecting means embodying two passages each of which is capable of conveying fluid to the brake unit, a valve in one of said passages, a member for controlling the movable element of the valve, a pendulum, means operable by fluid pressure in the passage for connecting the pendulum to the member, a valve in the other passage, a suction motor for closing the last named valve and spring means for maintaining said valve open when the vacuum in said motor is less than a predetermined value.

13. In a vehicle provided with braking apparatus having an operator-operated member, means other than the usual operator-operated member for holding the brakes applied after being applied by said operator-operated member and comprising a movable element, a variable source of suction, control means for the holding means and comprising a vacuum-operated motor connected to the movable element and having its suction chamber continuously in communication with the source of suction whereby said suction will at all times tend to cause operation of the motor and movable element and the holding means to be effective, and means for preventing said vacuum motor from operating the movable element and causing said holding means to be effective except when the vacuum therein is greater than a predetermined degree.

14. In a vehicle provided with fluid-actuated braking apparatus comprising a fluid-actuated brake unit, a source of pressure and conduit means for connecting the source of pressure to the brake unit, means comprising a valve associated with said conduit means for preventing the return flow of fluid from the brake unit to the source of pressure, a variable source of suction, control means for the valve and comprising a vacuum operated motor connected to operate the valve and having its suction chamber continuously in communication with the source of suction whereby said suction will at all times tend to cause operation of the motor and movable element and the holding means to be effective, and means for preventing said vacuum motor from operating the valve and causing the valve to be effective to prevent return flow of fluid except when the vacuum therein is greater than a predetermined degree.

15. In a vehicle provided with fluid-actuated braking apparatus comprising a fluid-actuated brake unit, a source of pressure and conduit means for connecting the source of pressure to the brake unit, means comprising a valve associated with said conduit means for preventing the return flow of fluid from the brake unit to the source of pressure, a variable source of suction, control means for the valve and comprising a vacuum-operated motor connected to operate the valve and continuously in communication with the source of suction, means for preventing said vacuum motor from operating the valve and causing the valve to be effective to prevent return flow of fluid except when the vacuum therein is greater than a predetermined degree, and automatically operable means for causing said valve to be ineffective when the vehicle is stopped and notwithstanding the vacuum motor is operated by the source of suction.

WALTER R. FREEMAN.